United States Patent [19]
Kirsch

[11] Patent Number: 4,514,374
[45] Date of Patent: Apr. 30, 1985

[54] METAL BROMIDE PREPARATION
[75] Inventor: Warren B. Kirsch, Baton Rouge, La.
[73] Assignee: Ethyl Corporation, Richmond, Va.
[21] Appl. No.: 434,504
[22] Filed: Oct. 15, 1982
[51] Int. Cl.³ .............................................. C01F 11/34
[52] U.S. Cl. ..................................... 423/497; 423/491
[58] Field of Search ................ 423/163, 491, 497, 499

[56] References Cited
U.S. PATENT DOCUMENTS

| | | | |
|---|---|---|---|
| 1,775,598 | 9/1930 | Van Der Meulen | 423/499 |
| 1,843,355 | 2/1932 | Behrman | 423/499 |
| 1,863,375 | 6/1932 | Jones | 423/499 |
| 1,916,457 | 7/1933 | Behrman | 423/499 |
| 2,007,758 | 7/1935 | Harlow et al. | 423/499 |
| 2,269,733 | 1/1942 | Pearson | 423/499 |
| 3,431,068 | 3/1969 | Burk | 423/499 |
| 3,462,241 | 8/1969 | Sedley | 423/497 |
| 4,083,942 | 4/1978 | Sanders | 423/497 |
| 4,234,556 | 11/1980 | del Valle | 423/497 |

FOREIGN PATENT DOCUMENTS 285915 9/1928 United Kingdom ................ 423/497

Primary Examiner—Earl C. Thomas
Attorney, Agent, or Firm—Donald L. Johnson; John F. Sieberth; Paul H. Leonard

[57] ABSTRACT

Metal bromides, and particularly alkaline earth metal bromides, are prepared from an alkaline earth metal compound and bromine in the presence of added lower alkanol as a reducing agent.

6 Claims, No Drawings

METAL BROMIDE PREPARATION

TECHNICAL FIELD

This invention relates to the preparation of metal bromides, and more particularly alkaline earth metal bromides. Further, the invention relates to a novel process for preparing metal bromides from a basic metal compound and bromine in the presence of alkanol as a reducing agent.

BACKGROUND OF THE INVENTION

Preparation of metal bromides from a basic metal compound and bromine in the presence of a reducing agent has been known for a long time.

For example, U.S. Pat. No. 1,775,598 discloses the use of reducing agents which are converted into water and/or gases. These may be nitrogen-containing organic or inorganic compounds such as urea, cyanamide, ammonia, ammonium carbonate, ammonium bicarbonate, formamide, carbamates, and ammonium cyanide; or easily decomposable organic acids such as formic or oxalic acid; or ammonium or metal derivatives of these compounds (e.g. calcium nitride, metal formates, or oxalates). Substances which give similar reducing agents on mixing (e.g. hexamethylenetetramine) also are disclosed. British Patent No. 285,915 has a similar disclosure.

U.S. Pat. No. 1,843,355 discloses use of charcoal as a reductant. U.S. Pat. No. 1,863,375 and 2,007,758 both relate to the use of ammonia as the reducing agent. U.S. Pat. No. 1,916,457 pertains to the use of carbon as a reductant, principally in the formation of sodium bromate.

U.S. Pat. No. 2,269,773 also discloses the use of a variety of reducing agents and alternative reaction sequences. U.S. Pat. No. 4,083,942 discloses the use of formic acid as a reactant, and illustrates the process with the following equation:

$$Ca(OH)_2 + HCOOH + Br_2 \rightarrow CaBr_2 + CO_2 + 2H_2O$$

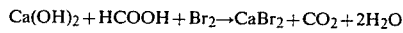

In the process of that patent, bromine and the alkaline compound are alternatively and incrementally added to an aqueous mixture of formic acid and a less than equivalent amount of metal compound, while maintaining the pH below 7.0.

U.S. Pat. No. 3,462,241 relates to the reaction of lime and bromine in the absence of a reductant:

$$2Br_2 + 2Ca(OH)_2 \rightarrow Ca(OBr)_2 + 2H_2O + CaBr_2$$

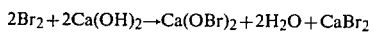

The yield of calcium bromide by this method is about 9–12%.

More recently, it was disclosed in U.S. Pat. No. 4,248,850 that metal bromides could be prepared by contacting in an aqueous medium a basic metal compound and bromine in the presence of added formaldehyde as a reducing agent. While this method affords certain advantages over those prior art processes which use nitrogen-containing organic or inorganic compounds as reducing agents—namely the elimination of foaming problems due to the liberation of nitrogen gas formed during the reaction, the use of formaldehyde as a reductant often results in the presence of unreacted formaldehyde in the product mixture which is difficult to remove and thereby adds to the cost of producing the desired metal bromide products.

In U.S. Pat. No. 3,431,068, there is disclosed a method of preparing alkali metal halides by reacting an alkali metal hydroxide with an elemental halogen in a liquid, saturated aliphatic or alicyclic alcohol or ketone, or a saturated aliphatic aldehyde. According to this process, the formation of unwanted halate salt by-products associated with alkali metal halide production is diminished or eliminated.

It has now been discovered that metal bromides can be prepared in high yields by contacting a basic metal compound, in particular an alkaline earth metal compound, in an aqueous medium with bromine in the presence of a lower alkanol as a reducing agent whereby those problems inherent in using formaldehyde as a reductant, aforediscussed, are eliminated.

THE INVENTION

Thus, the invention pertains to a process for preparing metal bromides which comprises contacting in an aqueous medium a basic metal compound and bromine in the presence of added alkanol as a reducing agent.

In preferred embodiments, the invention relates to the preparation of $ZnBr_2$ and alkaline earth metal bromides, more preferably, $CaBr_2$. In a particular aspect, the invention pertains to a process for the preparation of $CaBr_2$, said process comprising reacting lime and bromine in an aqueous reaction medium using added alkanol as a reducing agent, said process being carried out by adding separately to a water-lime mixture (i) methanol, and (ii) bromine, the relative rates of addition being such that the reaction temperature is maintained in the range of from about 0° C. up to the reflux temperature of the mixture with the amount of calcium compound being at least substantially stoichiometric or more than stoichiometric with respect to said bromine reactant, and the amount of alkanol added being stoichiometric or slightly in excess of stoichiometry with respect to the bromine. Preferably, the process of this invention is conducted by contacting a basic metal compound and bromine in the presence of an aqueous medium and added alkanol. The alkanol acts as reducing agent.

Alkaline earth metal compounds are preferred as basic metal compounds. Preferred compounds are calcium hydroxide, and calcium carbonate. Other useful compounds include zinc hydroxide and zinc carbonate. A most preferred basic metal compound is calcium hydroxide.

Alkanol reductants which can be employed in the instant process include alkanols of from 1 to about 8 carbon atoms. The alcohol can be primary, secondary or tertiary. The preferred alkanol is methanol.

A preferred use of the process of this invention is in the preparation of $CaBr_2$ fluid. Preparation of $ZnBr_2$ also is contemplated.

The reaction can be depicted schematically as follows:

$$3Ca(OH)_2 + 3Br_2 + CH_3OH \rightarrow 3CaBr_2 + CO_2 + 5H_2O$$

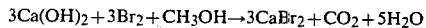

The following examples illustrate the process of the invention.

EXAMPLE 1

Water (22.63 g; 1.26 moles), methanol (2.01 g; 0.063 mole), and lime (7.85 g; 0.106 mole) were added to a 100 mL, three-neck round bottom flask equipped with an overhead mechanical stirrer and an addition funnel. Bromine was added dropwise with stirring to the flask from the addition funnel. The reaction mixture became hot and required external cooling to prevent refluxing. After 4.5 mL bromine had been added, an additional quantity of lime (7.84 g; 0.106 mole) was added to the flask and bromine addition was continued. After the addition of 9 mL of bromine, some carbon dioxide began to evolve. Total bromine addition was 9.5 mL (28.8 g; 0.18 mole). The reaction mixture was then heated to 50°-60° C. and held at that temperature for one hour and then to 70° for 0.5 hour. The solution was cooled and filtered to give a calcium bromide solution having a density of 14 lbs/gal. Analysis by NMR showed only 0.03 weight percent of unreacted methanol remaining. The presence of formaldehyde and formic acid could not be detected.

EXAMPLE 2

Water (18.4 g; 1.02 mole) and lime (7.85 g; 0.106 mole) were charged to a 100 mL, three-neck round bottom flask equipped with an overhead mechanical stirrer and two addition funnels. One addition funnel was charged with methanol (2.01 g; 0.063 mole) and water (4.28 g; 0.24 mole) and the other was charged with bromine (31.3 g; 0.196 mole). The reactants were then added dropwise with stirring and cooling. After the addition of 3.7 mL bromine and 3.5 mL of aqueous methanol, additional lime (7.84 g; 0.106 mole) was added to the flask. The remainder of the methanol and all of the bromine except for 1.34 mL then was added slowly to the flask with stirring. The mixture was then heated to 60° C. and held at that temperature for 1 hour, cooled and filtered to give a calcium bromide solution of approximate density of 14 lbs/gal. Analysis by NMR showed 0.33 weight percent of methanol remaining but no formaldehyde or formic acid could be detected.

EXAMPLE 3

Water (36.8 g; 2.04 mole) and lime (15.70 g; 0.212 mole) were added to a three-neck round bottom flask equipped with an overhead mechanical stirrer and two addition funnels. One addition funnel was charged with methanol (4.02 g; 0.126 mole) and water (8.56 g; 0.48 mole) and the other was charged with bromine (62.6 g; 0.392 mole). The reactants were then added dropwise with stirring and cooling. After the addition of 7.4 mL bromine and 7.0 mL of aqueous methanol, additional lime (15.68 g; 0.212 mole) was added to the flask. The remainder of the methanol and all of the bromine except for 2.6 mL was added slowly to the flask with stirring. The mixture then was heated to 60° C. for 1 hour, cooled and filtered to give a calcium bromide solution of an approximate density of 14 lbs/gal. Analysis by NMR showed that the filtered product contained 0.38 weight percent methanol and no detectable formaldehyde. However, 0.07 weight percent formic acid was detected in the product.

Having described the process which Applicant regards as his invention, it should be recognized that changes and variations within the scope and spirit of the invention can be made by one skilled in the art and it is accordingly to be understood that the present description of the invention is illustrative only. It is desired that the invention be limited only by the lawful scope of the following claims.

I claim:

1. A process for preparing an aqueous metal bromide solution which comprises contacting in an aqueous medium a compound selected from the group consisting of calcium hydroxide, calcium carbonate and lime, with bromine in the presence of a lower alkanol as a reducing agent, the amount of lower alkanol being stoichiometric to slightly in excess of stoichiometric based upon bromine wherein said stoichiometric amount is about 1 mole of alkanol for each 3 moles of bromine.

2. The process of claim 1 wherein said alkanol is a lower aliphatic alkanol having from 1 to about 8 carbon atoms.

3. The process of claim 1 wherein said alkanol is methanol.

4. The process of claim 1 wherein said process is conducted at a temperature of from about 0° C. to the reflux temperature of the reaction mixture.

5. The process of claim 1 wherein said compound is lime.

6. A process for preparing an aqueous calcium bromide solution comprising reacting in an aqueous medium, lime and bromine, in the presence of methanol, said bromine and said methanol being added separately to a water-lime mixture, the amount of said lime being at least substantially stoichiometric with respect to said bromine and the amount of said methanol being substantially stoichiometric to slightly in excess of stoichiometric based upon said bromine wherein the stoichiometric amount of said methanol is about 1 mole for each 3 moles of said bromine.

* * * * *